United States Patent
Parrella, Sr.

(10) Patent No.: US 9,091,460 B2
(45) Date of Patent: Jul. 28, 2015

(54) SYSTEM AND A METHOD OF OPERATING A PLURALITY OF GEOTHERMAL HEAT EXTRACTION BOREHOLE WELLS

(71) Applicant: GTherm Inc., Westport, CT (US)

(72) Inventor: Michael J Parrella, Sr., Weston, CT (US)

(73) Assignee: GTherm, Inc., Westport, CT (US)

( * ) Notice: Subject to any disclaimer, the term of this patent is extended or adjusted under 35 U.S.C. 154(b) by 0 days.

(21) Appl. No.: 14/221,742

(22) Filed: Mar. 21, 2014

(65) Prior Publication Data

US 2015/0021924 A1    Jan. 22, 2015

(51) Int. Cl.
    F03G 7/00    (2006.01)
    F24J 3/08    (2006.01)
    F03G 7/04    (2006.01)
    H02K 7/18    (2006.01)

(52) U.S. Cl.
    CPC . *F24J 3/081* (2013.01); *F03G 7/04* (2013.01); *H02K 7/1807* (2013.01); *F24J 2003/088* (2013.01)

(58) Field of Classification Search
    CPC ........................................... F03G 7/00
    USPC ............................................ 60/641.2; 290/2
    See application file for complete search history.

(56) References Cited

U.S. PATENT DOCUMENTS

| | | | |
|---|---|---|---|
| 4,030,549 A * | 6/1977 | Bouck | 166/280.1 |
| 4,042,012 A * | 8/1977 | Perry et al. | 165/45 |
| 4,051,677 A | 10/1977 | Van Huisen | |
| 4,060,988 A * | 12/1977 | Arnold | 60/641.2 |
| 4,277,946 A * | 7/1981 | Bottum | 62/235 |
| 4,642,987 A * | 2/1987 | Csorba et al. | 60/641.2 |
| 4,912,941 A | 4/1990 | Buchi | |
| 5,081,848 A * | 1/1992 | Rawlings et al. | 62/260 |
| 5,497,624 A | 3/1996 | Amir et al. | |
| 6,259,165 B1 * | 7/2001 | Brewington | 290/1 A |
| 7,198,107 B2 * | 4/2007 | Maguire | 166/308.2 |
| 8,534,069 B2 | 9/2013 | Parrella | |
| 8,616,000 B2 * | 12/2013 | Parrella | 60/641.2 |
| 2006/0249276 A1 * | 11/2006 | Spadafora et al. | 165/45 |
| 2007/0193743 A1 * | 8/2007 | Harris et al. | 166/256 |
| 2009/0320475 A1 * | 12/2009 | Parrella | 60/641.2 |
| 2011/0316337 A1 | 12/2011 | Pelio et al. | |

FOREIGN PATENT DOCUMENTS

WO         WO 9963282 A1 * 12/1999

\* cited by examiner

*Primary Examiner* — Joseph Waks
(74) *Attorney, Agent, or Firm* — Ware, Fressola, Maguire and Barber LLP

(57) ABSTRACT

A system and method of operation are shown where the system includes a plurality of geothermal wells, each well having a heat exchanger therein including closed cycle system piping to and from the surface, each well having plurality of appendages drilled in multiple directions in relation to the central borehole of the well and filled with heat conductive material in order to conduct heat from the appendages to the heat exchanger. At least one upstream working fluid manifold is connected at manifold inlets to piping conveying hot working fluid pumped from the closed cycle system piping of more than one of the plurality of geothermal heat extraction borehole wells and connected by manifold outlets to piping conveying the pumped hot working fluid to at least one heat engine.

17 Claims, 10 Drawing Sheets

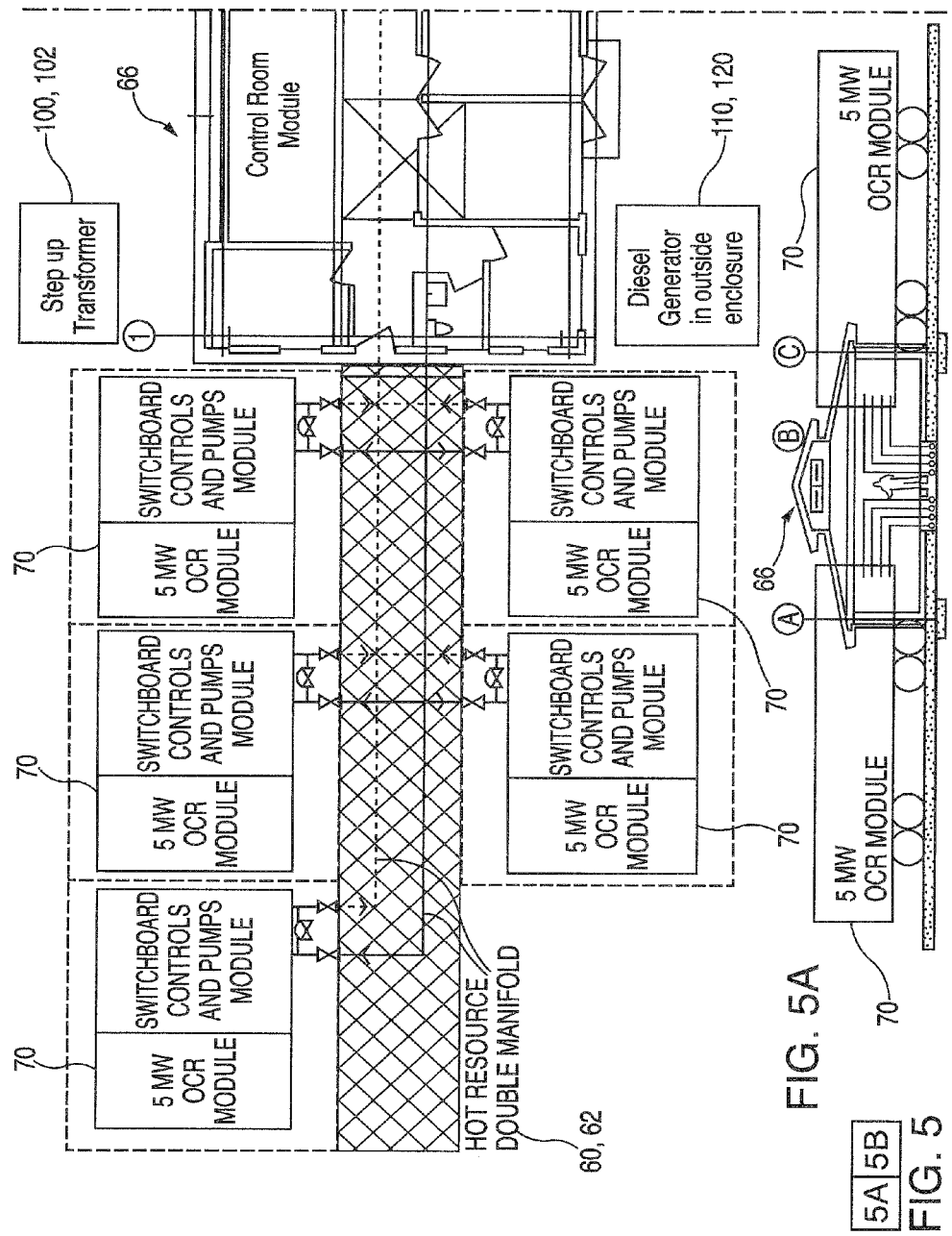

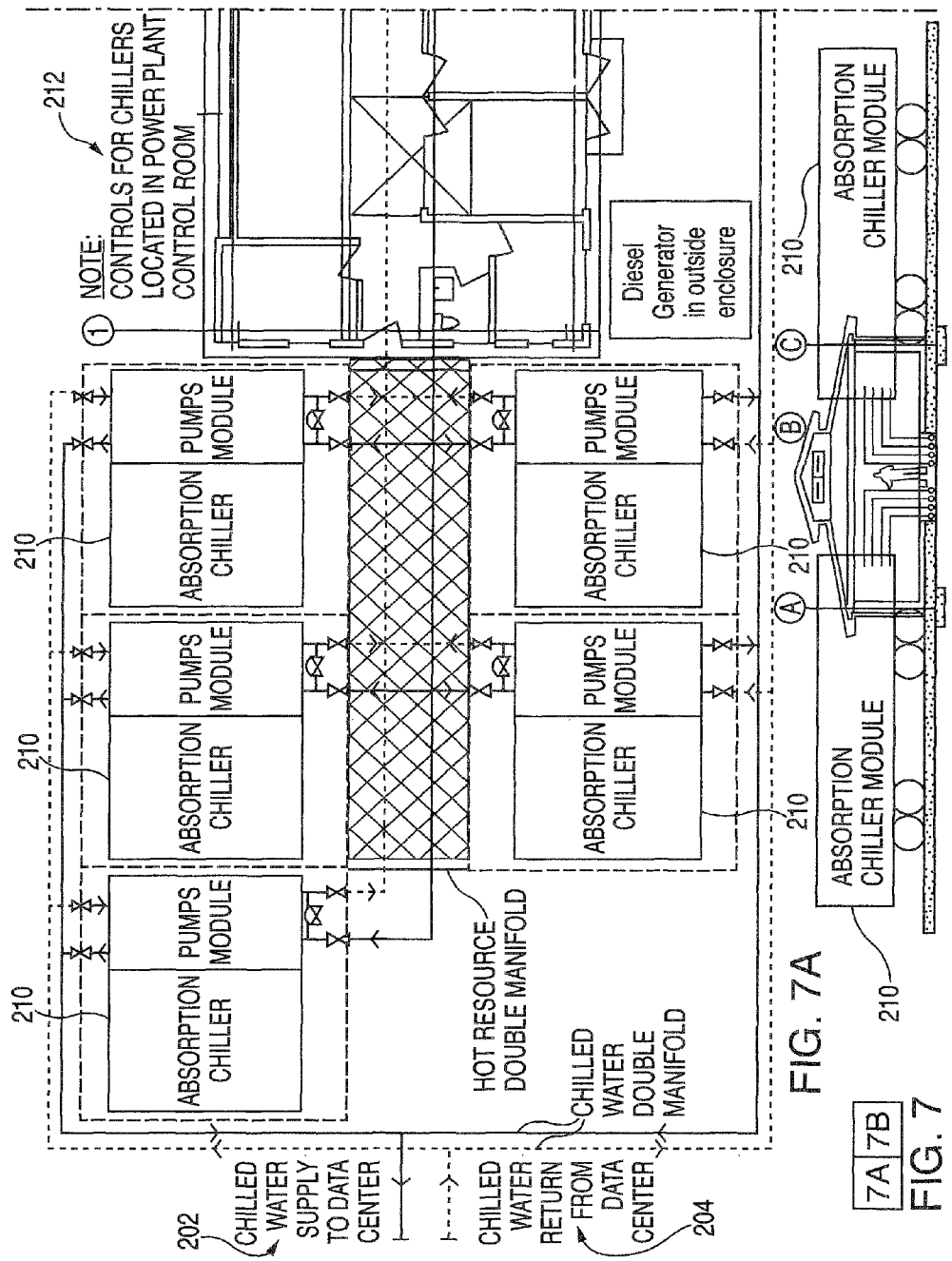

SYSTEM AND A METHOD OF OPERATING A PLURALITY OF GEOTHERMAL HEAT EXTRACTION BOREHOLE WELLS

BACKGROUND

Open loop geothermal well systems typically depend upon the extraction of groundwater from a source e.g. a subsurface aquifer and then passing the water through a heat pump. Subsequently, the water is either disposed of at the surface or re-injected back to the aquifer through a dedicated secondary borehole located some distance from the extraction borehole. These systems suffer from corrosion and high maintenance costs as well as raising environmental concerns. Closed loop systems have advantages over the open loop systems since the working fluid circulates within the piping system between the surface and the interior of the well in a self-contained manner.

SUMMARY

A geothermal heat extraction system is disclosed in co-pending patent application Ser. No. 12/456,434 (now U.S. Pat. No. 8,616,000) having a closed loop vertical borehole heat exchanger and a plurality of appendages drilled in multiple directions in relation to the borehole of the well and filled with heat conductive material. This new approach to geothermal heat extraction is an advance over the prior art in that the appendages augment the heat harvesting ability to a great degree. Given this advance, a new avenue of exploitation thereof is summarized below.

According to a first aspect of the present invention, a system is provided comprising a plurality of geothermal heat extraction borehole wells, each well having a heat exchanger therein including closed cycle system piping to and from the surface, and each well having plurality of appendages drilled in multiple directions in relation to the central borehole of the well and filled with heat conductive material in order to conduct heat from the appendages to the heat exchanger; and at least one upstream working fluid manifold connected at manifold inlets to piping conveying hot working fluid pumped from the closed cycle system piping of more than one of the plurality of geothermal heat extraction borehole wells and connected by manifold outlets to piping conveying the pumped hot working fluid to at least one heat engine. By heat engine is meant any system that performs a conversion of heat or thermal energy to mechanical energy which can then be used to do mechanical work.

According to a second aspect of the present invention, a method is provided comprising operating a plurality of geothermal heat extraction borehole wells, each well having a heat exchanger therein including closed cycle system piping to and from the surface, and each well having plurality of appendages drilled in multiple directions in relation to the central borehole of the well and filled with heat conductive material in order to conduct heat from the appendages to the heat exchanger, wherein the operating of the plurality of geothermal heat extraction borehole wells includes conveying hot working fluid to at least one upstream working fluid manifold connected at manifold inlets to piping conveying hot working fluid pumped from the closed cycle system piping of more than one of the plurality of geothermal heat extraction borehole wells and connected by manifold outlets to piping conveying the pumped hot working fluid to at least one heat engine, the heat engine extracting heat from the working fluid and performing mechanical work.

DETAILED DESCRIPTION

Figure 1:
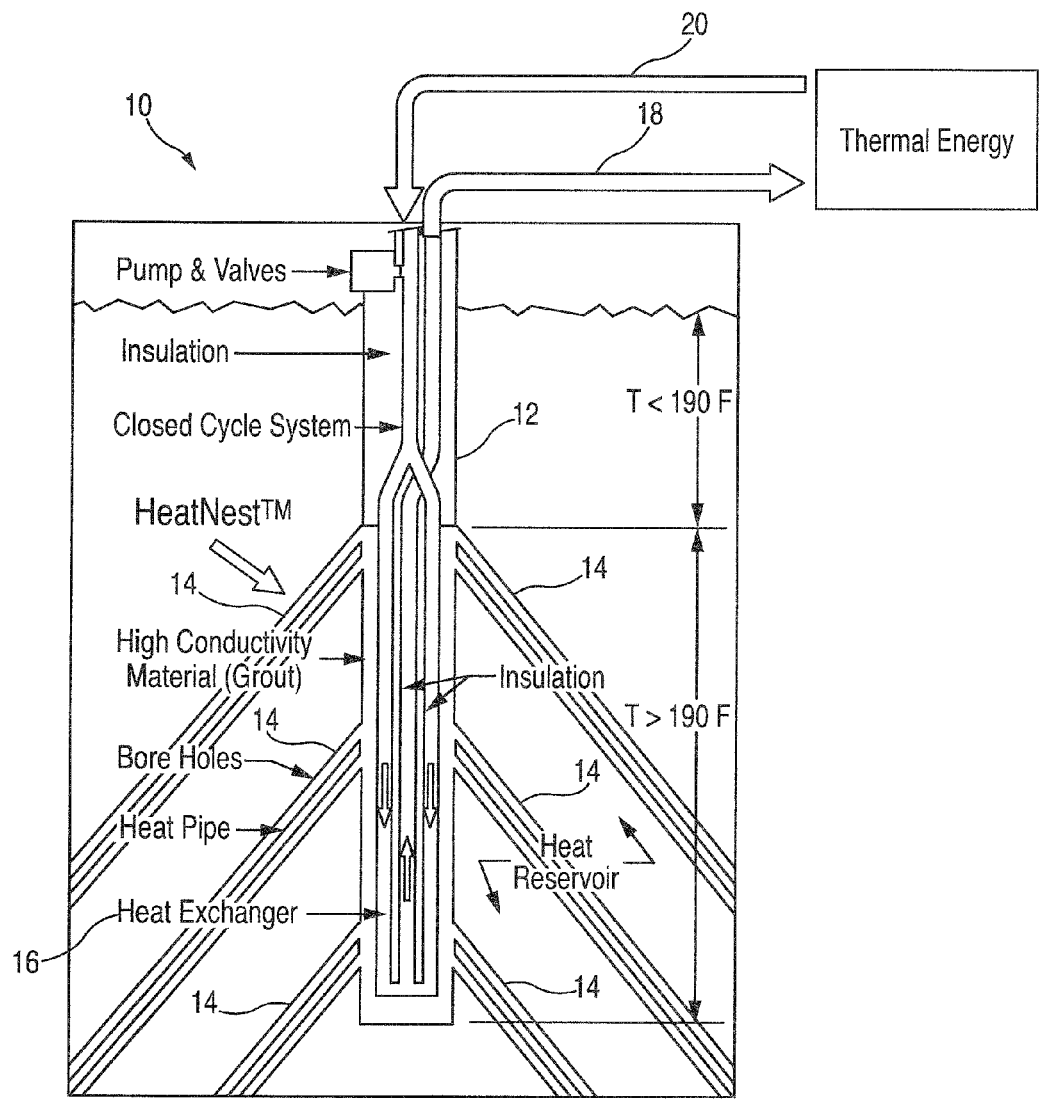
FIG. 1 shows a geothermal well having a central borehole well drilled down to a region of hot rock with lateral holes drilled out into hot rock.
Figure 2:
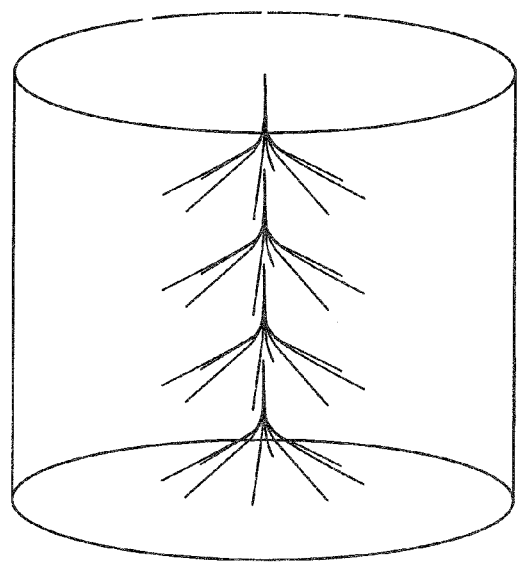
FIG. 2 shows a geothermal well such as shown in FIG. 1 having the central borehole with the drilled lateral holes shown in perspective.

FIG. 1 shows a geothermal well 10 such as disclosed in the above-mentioned co-pending application Ser. No. 12/456, 434 (now U.S. Pat. No. 8,616,000) having a central borehole 12, e.g. a 17.5" (0.45 m) diameter well drilled down to a region of hot rock with lateral holes 14 drilled out into hot rock in various radial directions around the central borehole such as shown in FIG. 2. The lateral boreholes may be filled with heat conductive material to form "appendages" to the central borehole. The working fluid used in the closed loop system may for instance be water or another suitable fluid or mixture of different fluids.

Although not required for the apparatus taught herein, as shown in detail in co-pending application Ser. No. 14/202, 778 (filed Mar. 10, 2014) heat pipes may additionally be inserted and grouted into the lateral holes 14 to harvest even more heat (via enhanced "appendages") and bring it to the central borehole where a heat exchanger 16 transfers heat into a closed cycle system ("closed loop") that brings heat to the surface by pumping cool working fluid 20 into the well and hot working fluid 18 emerges out of the well.

Figure 3:
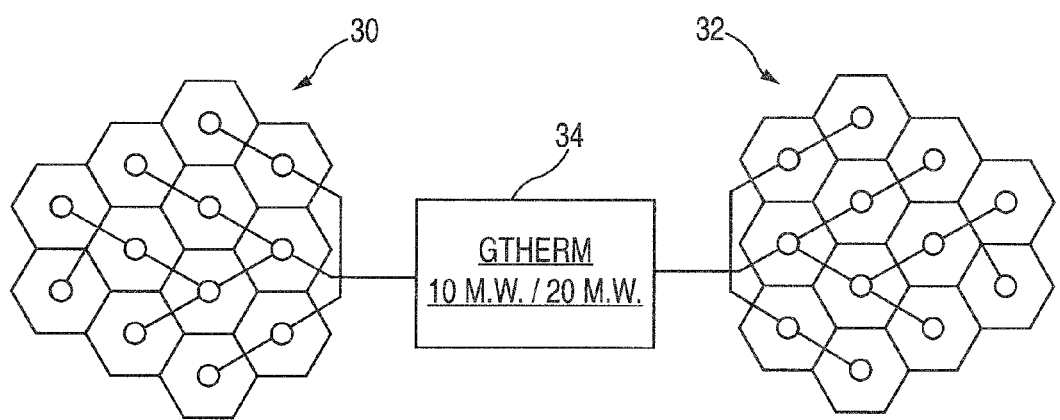
FIG. 3 shows, in exemplary fashion, two local regions of land on either side of a central power plant of relatively small scale, each region including a plurality of geothermal closed loop borehole wells laid-out in adjacent plots of land.

FIG. 3 shows plural (e.g., two) local regions 30, 32 of land on either side of an exemplary central power plant 34 of relatively small scale, e.g., 10/20 MW more or less, depending on the number of wells and their thermal transfer capabilities. Each region includes a plurality of geothermal closed loop borehole wells laid out in adjacent plots of land, e.g. each about two acres in size. Although each plot is shown as a hexagonal plot adjoining other hexagonal plots, the plots need not have that sort of a boundary but may instead have metes and bounds dictated by the particular lay of the land that may or may not be uniform. Each well has a heat exchanger therein including closed cycle system piping to and from the surface such as shown in FIG. 1. The power plant may be located within one of the regions instead of in between as shown. Each well has plurality of appendages drilled in multiple directions in relation to the central borehole of the well, such as shown in FIG. 2, and filled with heat conductive material (and/or heat pipes) in order to conduct heat from the appendages to its heat exchanger. The exemplary power plant is at least able to generate electricity for consumption and/or storage and may also be able to provide cooling by converting the geothermal heat conveyed from the various wells for e.g. local consumption in the local regions or their local geographic vicinity. It should be realized that the example of FIG. 4 described below is only exemplary and the teachings hereof are generally applicable to any system that performs the conversion of heat or thermal energy to mechanical energy which can then be used to do mechanical work. A heat engine does this by bringing a working substance from a higher state temperature to a lower state temperature and exploiting the properties of the working substance. It should be understood that the teachings hereof are applicable to heat engines of any kind, in any combination, and are not confined to the example application of FIG. 3 or those of FIGS. 4-7 below. Thus, a particular application could be confined to one type of heat engine or combination of different types of heat engines without any particular type or types being specified herein as a requirement. The application shown, using a low entropy electric generator in one application should not be viewed as a limiting the general applicability of the teachings hereof.

Figure 4:
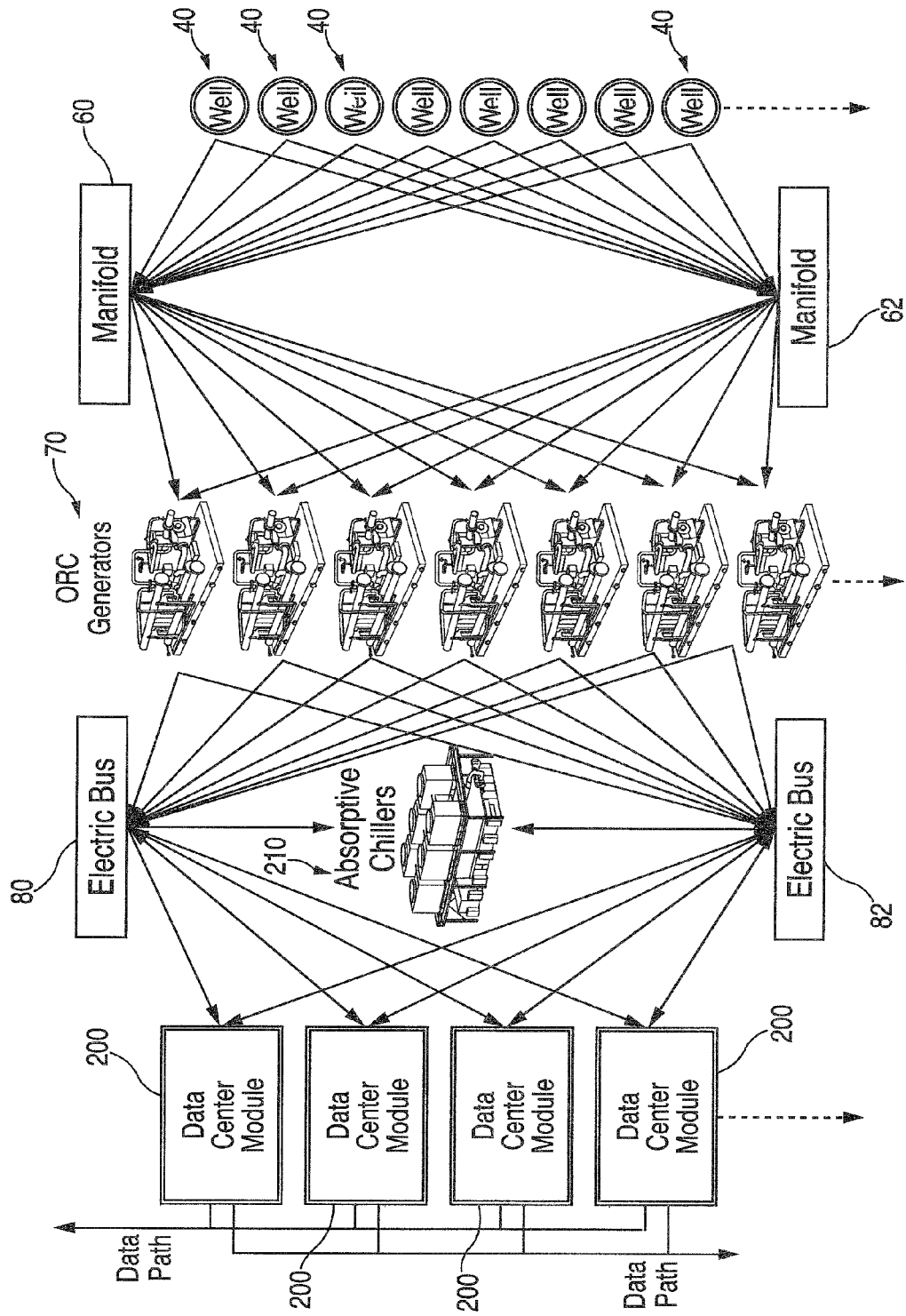
FIG. 4 shows an embodiment of a redundant system according to the teachings hereof.

FIG. 4 shows on the right hand side of the figure a plurality of geothermal heat extraction borehole wells 40 of the sort described in FIGS. 1-3, each having its closed loop upstream piping from the well connected to at least two upstream manifolds 60, 62 provided for the purpose of increasing reliability by redundancy. Each upstream manifold may be a chamber or pipe having a number of inlets and outlets used to collect a portion, e.g., half of the hot working fluid (hot resource) pumped from each of the plurality of wells to the surface. As suggested above, the outlets of the redundant manifolds may be connected to any kind of heat engine such as but not limited to the low entropy electric generators and/or absorptive coolers described below.

Figure 5B:
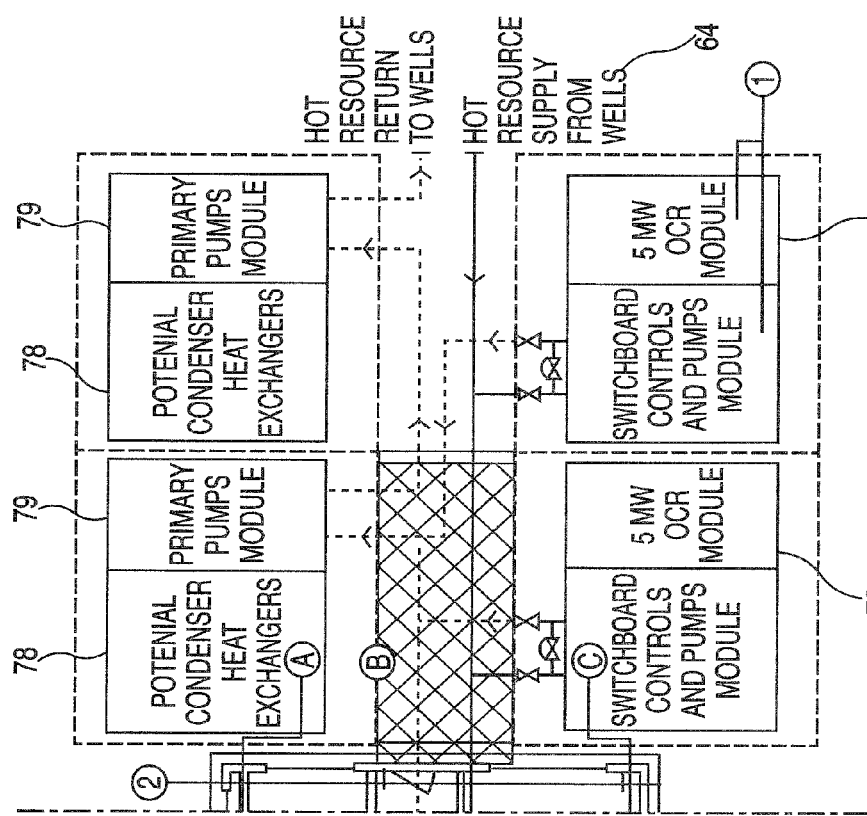
FIG. 5 shows how FIG. 5A and FIG. 5B fit together to show an example of a plurality of heat engines such as low entropy electric generator modules, e.g. ORC (Organic Rankine Cycle) modules, interfaced to a power plant control center via a hot resource double manifold.

As shown in FIGS. 5A and 5B, which fit together as shown in FIG. 5, above-ground upstream piping 64 carrying hot resource "supply" lines from a plurality of wells 40 may be connected to a hot resource double manifold (redundant manifolds) 60, 62 shown in a cross-hatched area with valves that may be controlled from a central location such as a nearby control plant 34 as exemplified in FIG. 3 or in the small office building ("pod plant") 66 shown in FIG. 5 having a control room module therein.

Referring back to FIG. 4, the hot working fluid in this embodiment may be conveyed from outlets of each manifold by redundant piping to each of a plurality of electricity generators such as low entropy electric generators, e.g., ORC (Organic Rankine Cycle) generators 70 shown for example as 5 MW ORC modules in FIG. 5, each accompanied by switchboard controls and a pumps module. Thus, each manifold 60, 62 distributes a proportional part of the pumped upstream hot working fluid 64 to each of the plurality of electric generators. It is noted that the exemplary number (seven) of ORC generators 70 shown in FIG. 4 corresponds to the number of 5 MW ORC modules 70 shown in FIG. 5. Each of these may be embodied as transportable units that may be transportable by trailer, e.g., that may be transported entirely by truck or flown in by air transport from the manufacturer to a remote site and then towed a shorter distance by a truck connected to a given ORC module by a suitable trailer hitch and then moved into position as shown arranged around the office building in FIG. 4. Although not shown in FIG. 4, it should be realized that a redundant (e.g. double) manifold approach may also be used for returning the working fluid by "return" lines to the wells after the heat is extracted for producing electricity by the plurality of ORC modules 70. It should also be realized that although the redundant design of FIG. 4 is disclosed in the context of the plurality of geothermal heat extraction borehole wells of the sort described in FIGS. 1-3, the redundancy principles disclosed are generally applicable to other types of geothermal heat extraction borehole wells and indeed may also be applicable in whole or in part to other types of renewable (so-called "green") sources of thermal energy or power not specifically disclosed herein.

As shown to the left of the plural (e.g. seven) ORC generators in FIG. 4, each ORC generator 70 is provided with dual electric power outlets connected to respective redundant electric busses 80, 82. The dual outlets may be the same electric bus within a given ORC module or they may be connected to separate internal busses that may be independent or connectable by internal switchgear. According to the teachings hereof, the electricity generated by the electricity generators and delivered to the redundant busses may be used for any purpose.

Figures 6, 6A:
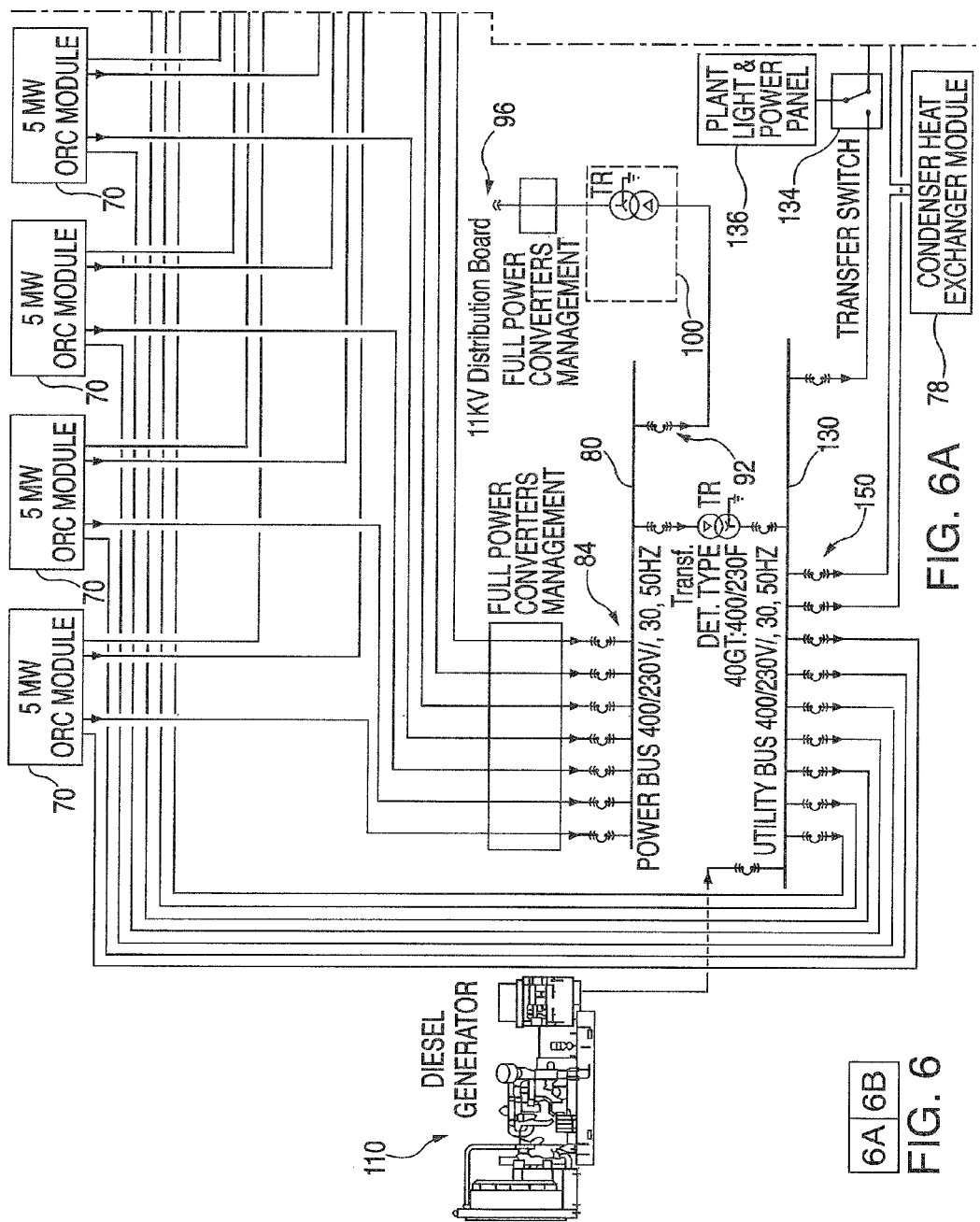
FIG. 6 shows how FIG. 6A and FIG. 6B fit together to show an electrical one-line diagram for redundant distribution of electrical power generated by the exemplary ORC modules of FIG. 4.
Figure 6B:
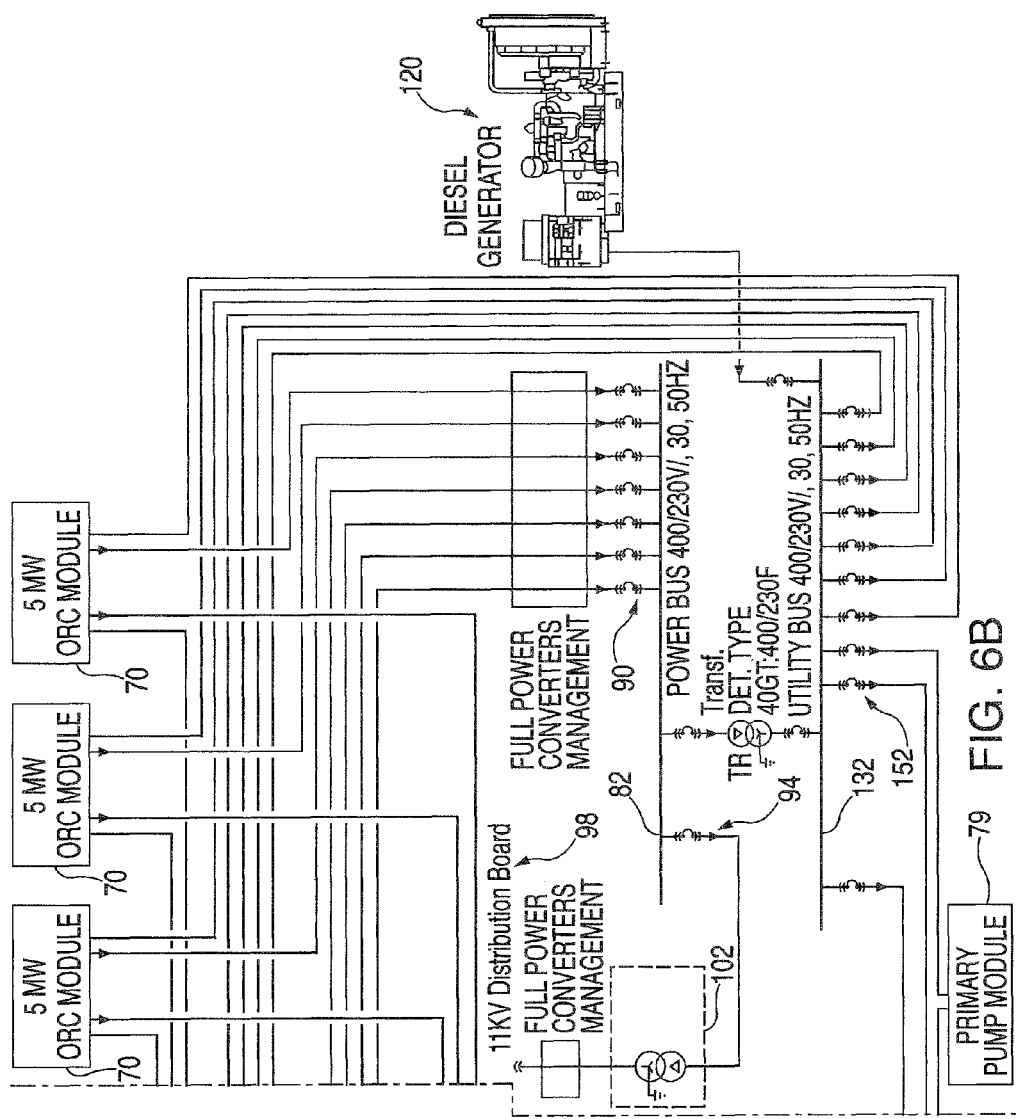

FIGS. 6A and 6B fit together as shown in FIG. 6 and together show a simplified electrical one-line drawing showing the plural (e.g. seven) ORC generators 70 of FIGS. 4 and 5A & 5B in a row at the top of the figure. Each ORC module 70 has an electrical connection through one of plural corresponding circuit breakers 84 (seven in the example) to the first power bus 80 of the two (redundant) electric busses of FIG. 4. The exemplary bus is a 400/230V/, 3-phase, 50 Hz bus but another type will work as well. The switchboard controls module (see FIG. 5A and FIG. 5B) associated with each ORC module in conjunction with the control room module permits synchronization of the electric power generated by the ORC module with the electric power on the bus before closing the circuit breaker. Likewise, each ORC module has an electrical connection through one of plural (seven in the example) additional corresponding circuit breakers 90 to the second power bus 82. Each of the two redundant power busses shown in FIG. 6 is connected by a corresponding output circuit breaker 92, 94 to a corresponding distribution board 96, 98 in order to supply the generated electric power for the intended purpose. The example of FIG. 6 shows each redundant bus feeding its output power through such an output breaker via a step-up transformer 100, 102 to the corresponding distribution board. A step-up transformer may but need not be used to step up the voltage of the redundant busses prior to distribution in order to economize on the cost of copper distribution lines. For instance, a 25 MVA dry type 400V/1 KV step-up transformer is illustrated.

Also shown in FIG. 6A and FIG. 6B, a pair of redundant diesel generators 110, 120 are provided to supply initial electric power to a pair of redundant utility busses 130, 132 to run the system during a startup period before working fluid can be sufficiently circulated within the well to gain sufficient heat during transport through the closed loop system, i.e., before the ORC modules 70 actually are able to start converting heat from the well in order to generate electricity. A transfer switch 134 may be provided to select one of the two diesel generators as the startup power source for supplying a plant light & power panel 136. Likewise either the two rightmost breakers of a group of breakers 150 or the two leftmost breakers of a group of breakers 152 are closed during startup to power condenser heat exchanger modules 78 and primary pump modules 79. Once the system is up and running, the electric power generated by one or more of the ORC modules 70 may be synchronized with the particular utility bus e.g. 130 of the redundant utility busses 130, 132 started by the selected diesel generator e.g. 110 and one or more of the leftmost seven breakers of the group 150 of nine breakers are closed. The two rightmost breakers for the diesel generator 110 may then be opened and the diesel generator 110 shut down. Assuming the electrical power generated on the power bus 80 is the same as that generated on the power bus 82 the breakers 90 may be closed. If not a synchronization process may be performed during the closing thereof.

Figure 7B:
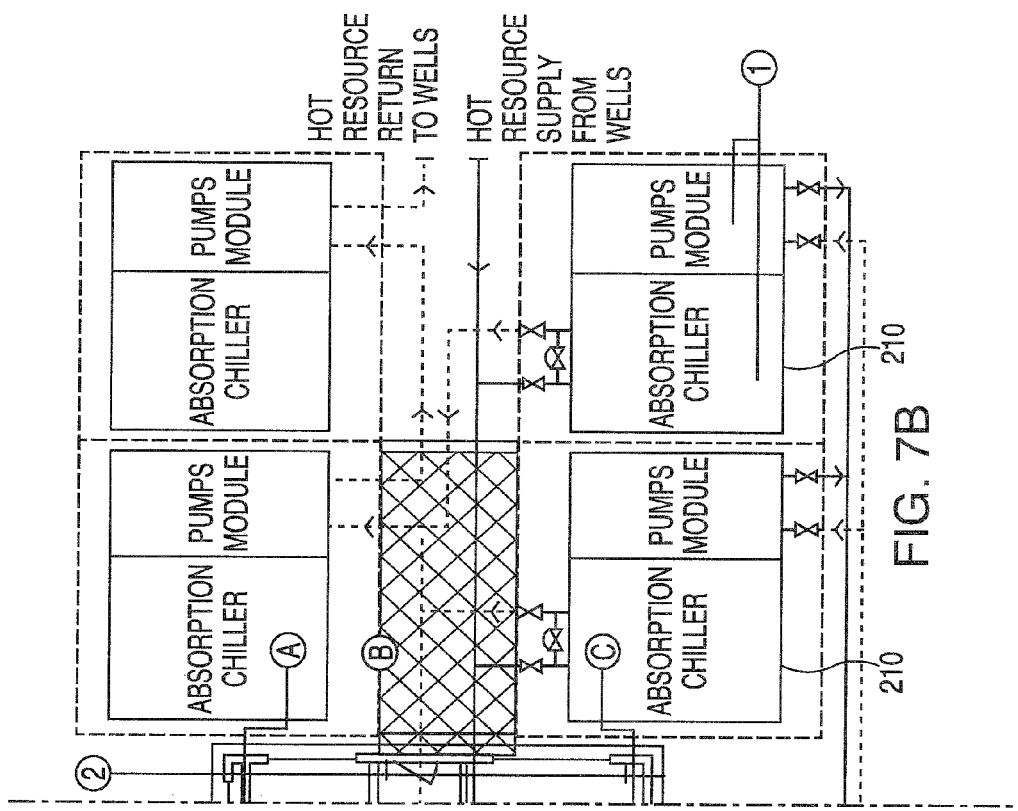
FIG. 7 shows how FIG. 7A and FIG. 7B fit together to show an embodiment with a heat engine such as a chiller plant that may be used for cooling a data center.

Referring back to FIG. 4, one application of the electric power such as that generated by the exemplary ORC generators 70 is to power a plurality of data center modules 200 via the electric busses 80, 82. In that case, it may also be advantageous to power a plurality of absorptive chillers 210 (e.g. seven chillers) that supply coolant 202 to the data center modules. FIG. 7A and FIG. 7B fit together as shown in FIG. 7 and together show an embodiment with a chiller plant 212 that may be used or added for cooling the data center modules 210. In an architecture similar to that shown in FIG. 5A and FIG. 5B, the chiller plant 212 has controls for controlling the plural absorptive chillers 210 fed by a hot resource supply from the wells via a hot resource double manifold which may be the same manifold 60, 62 or a different manifold from that shown in FIG. 5A and FIG. 5B. The absorption chiller modules 210 are shown as trailers in FIG. 7 similar to the trailers 70 of FIG. 5A and FIG. 5B that may be transportable to the site of the wells. The data center modules may include redundant data center modules in order to increase reliability. In addition, a redundant data path may be connected to each data center module 200 as shown in order to further increase reliability. The data paths may interface to a nationwide long-haul fiber network such as provided by the Allied Fiber company via short-haul fiber to one or more intermediate access points.

It is to be particularly noted that the disclosed system has advantages that go beyond being able to deliver thermal energy for conversion to mechanical energy (such as the illustrated conversion to electrical energy and/or coolant) in a highly efficient and environmentally friendly manner. There is also an important reliability advantage that will now be discussed. First, there is a distinct advantage to having a localized source of power that can be kept separate from the power grid and therefore not ultimately dependent on the power grid. Second, by having a self-contained power plant that is separate from the general power grid, it is possible to design a local power system with a degree of reliability that exceeds that which is generally available, even so-called Tier 4. For instance, assuming that a guaranteed availability for electric power for the above described data center would be 99.995% (Tier 4) with only 0.4 hours downtime permitted per year. Such Tier 4 availability might require N (e.g., five) ORC generators 70 and likewise N (e.g., five) absorptive chillers 210. Using an ORC module 70 approach with such modules transported to the site and connected to an extensible redundant manifold, it gives the possibility to increase reliability to an extraordinary degree by simply adding new modules, e.g., in an N+2 approach where instead of N modules required for Tier 4 availability, N+2 modules are deployed. In the example, seven ORC modules and seven absorptive chillers are deployed instead of five each. This will allow for instance a 99.999% guaranteed reliability or 0.0006 hours downtime per year. This goes beyond Tier 4 reliability with no dependency on any remote power supply (independent power production) and the cost will merely be in proportion to the designed density.

Figure 8:
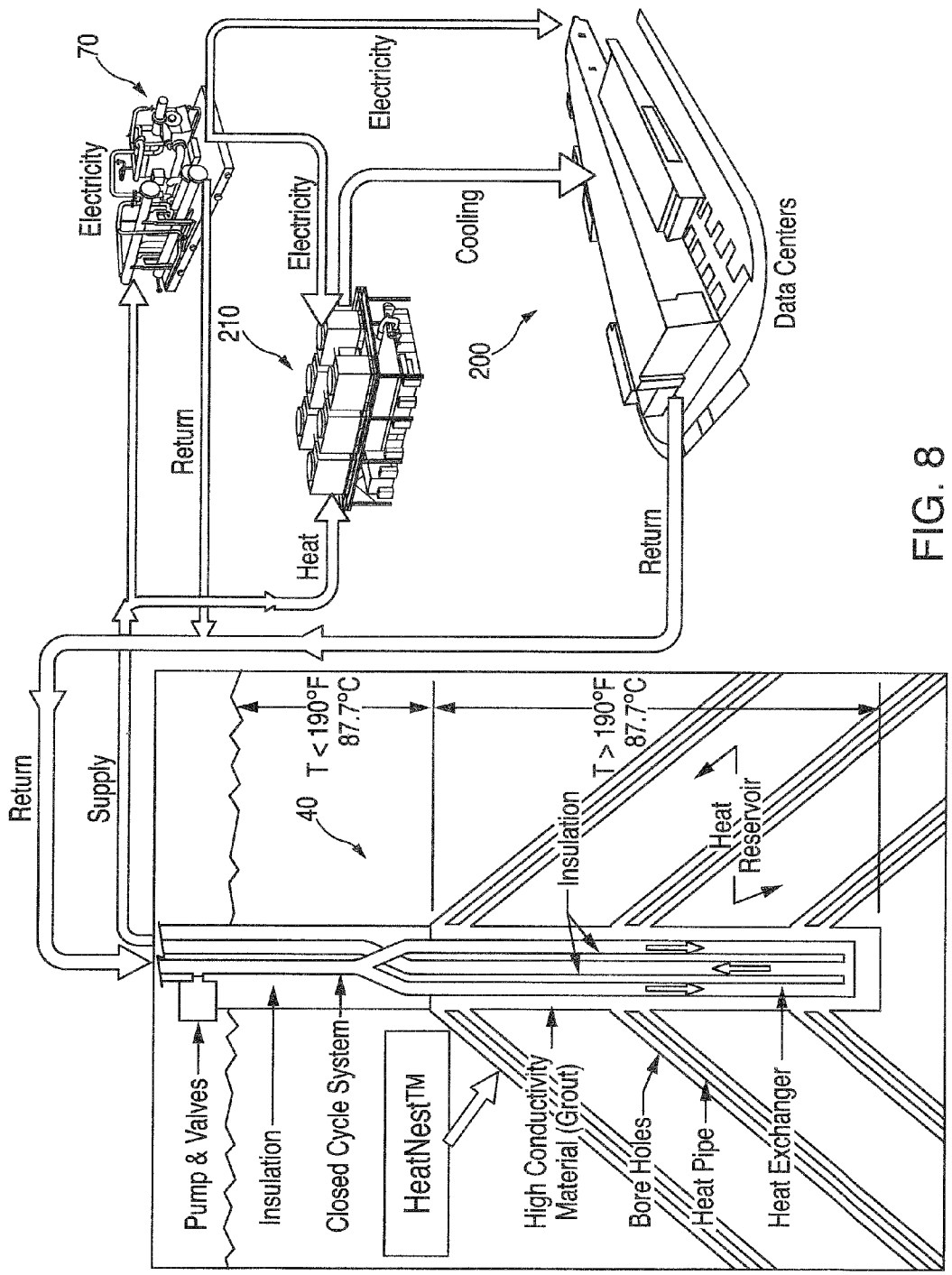
FIG. 8 is a diagram showing an overall "bird's eye view" of one more data centers located on a campus nearby the plurality of wells 40 of FIG. 4, with one of the wells shown.

FIG. 8 is a diagram showing an overall "bird's eye view" of one more data centers located on a campus nearby the plurality of wells 40 of FIG. 4, one well being shown providing heat via a hot resource supply line to one of the ORC generators 70 and one of the absorptive chillers of FIG. 4. Heat supplied to the ORC generator 70 is converted to electricity that is in turn provided via one or both of the utility busses 130, 132 to the chiller 210 and via one or both of the power busses 80, 82 to the one or more data centers 200. After the heat is extracted and converted to electricity by the ORC generator the working fluid is returned to the well via a return line as shown. Cooling is shown being provided from the chiller 210 to the one or more data centers and likewise returned to the well via a return line.

The invention claimed is:

1. A system, comprising:
 a plurality of geothermal heat extraction borehole wells, each well having a heat exchanger therein including closed cycle system piping to and from the surface, and each well having plurality of appendages drilled in multiple directions in relation to the central borehole of the well and filled with heat conductive material in order to conduct heat from the appendages to the heat exchanger; and
 at least one upstream working fluid manifold connected at manifold inlets to piping conveying hot working fluid pumped from the closed cycle system piping of more than one of the plurality of geothermal heat extraction borehole wells and connected by manifold outlets to piping conveying the pumped hot working fluid to at least one heat engine.

2. The system of claim 1, wherein the at least one upstream working fluid manifold is also connected by manifold outlets to piping conveying the pumped hot working fluid to at least one chiller.

3. The system of claim 2, further comprising at least one data center connected to the at least one chiller.

4. The system of claim 2, wherein the at least one heat engine comprises a plurality of low entropy electric generators that are greater than two in number than a number of electric generators required for ensuring Tier 4 reliability and the at least one chiller comprises a plurality of chillers that is greater than two in number than a number of chillers required for ensuring Tier 4 reliability.

5. The system of claim 4, wherein the plurality of low entropy electric generators are each connected via respective circuit breakers to a pair of redundant power busses and are also each connected via respective circuit breakers to a pair of redundant utility busses, wherein the pair of redundant utility busses are also connected via respective circuit breakers to respective startup electric generators.

6. The system of claim 1, further comprising at least one additional upstream working fluid manifold connected at manifold inlets of the additional manifold to piping conveying hot working fluid pumped from the closed cycle system piping of more than one of the plurality of geothermal heat extraction borehole wells and connected by manifold outlets of the additional manifold to piping conveying the pumped hot working fluid to at least one chiller.

7. The system of claim 6, further comprising at least one data center connected to the at least one chiller.

8. The system of claim 6, wherein the at least one heat engine comprises a plurality of low entropy electric generators that are greater than two in number than a number of electric generators required for ensuring Tier 4 reliability and the at least one chiller comprises a plurality of chillers that is greater than two in number than a number of chillers required for ensuring Tier 4 reliability.

9. The system of claim 1, wherein the at least one heat engine comprises a plurality of heat engines that are greater than two in number than a number of heat engines required for ensuring Tier 4 reliability.

10. A method, comprising:
operating a plurality of geothermal heat extraction borehole wells, each well having a heat exchanger therein including closed cycle system piping to and from the surface, and each well having plurality of appendages drilled in multiple directions in relation to the central borehole of the well and filled with heat conductive material in order to conduct heat from the appendages to the heat exchanger, wherein the operating of the plurality of geothermal heat extraction borehole wells includes conveying hot working fluid to at least one upstream working fluid manifold connected at manifold inlets to piping conveying hot working fluid pumped from the closed cycle system piping of more than one of the plurality of geothermal heat extraction borehole wells and connected by manifold outlets to piping conveying the pumped hot working fluid to at least one heat engine, the heat engine extracting heat from the working fluid and performing mechanical work.

11. The method of claim 10, wherein the at least one upstream working fluid manifold is also connected by manifold outlets to piping conveying the pumped hot working fluid to at least one chiller that provides coolant.

12. The method of claim 11, further comprising at least one data center connected to the at least one chiller and receiving the coolant from the chiller.

13. The system of claim 11, wherein the at least one heat engine comprises a plurality of low entropy electric generators that are greater than two in number than a number of electric generators required for ensuring Tier 4 reliability and the at least one chiller comprises a plurality of chillers that is greater than two in number than a number of chillers required for ensuring Tier 4 reliability.

14. The method of claim 10, further comprising at least one additional upstream working fluid manifold connected at manifold inlets of the additional manifold to piping conveying hot working fluid pumped from the closed cycle system piping of more than one of the plurality of geothermal heat extraction borehole wells and connected by manifold outlets of the additional manifold to piping conveying the pumped hot working fluid to at least one chiller that provides coolant.

15. The method of claim 14, further comprising at least one data center connected to the at least one chiller and receiving the coolant from the chiller.

16. The method of claim 10, wherein the at least one heat engine comprises a plurality of low entropy electric generators that are greater than two in number than a number of electric generators required for ensuring Tier 4 reliability.

17. The method of claim 10, wherein the plurality of low entropy electric generators are each connected via respective circuit breakers to a pair of redundant power busses and are also each connected via respective circuit breakers to a pair of redundant utility busses, wherein the pair of redundant utility busses are also connected via respective circuit breakers to respective startup generators.

* * * * *